(No Model.)

E. A. PARKER.
TABLE DISH.

No. 267,921. Patented Nov. 21, 1882.

Witnesses.
H. L. Bennett.
James Warner

Inventor.
Edmund A. Parker
by John P. Adams
his attorney

UNITED STATES PATENT OFFICE.

EDMUND A. PARKER, OF MERIDEN, CONNECTICUT.

TABLE-DISH.

SPECIFICATION forming part of Letters Patent No. 267,921, dated November 21, 1882.

Application filed September 20, 1882. (No model.)

*To all whom it may concern:*

Be it known that I, EDMUND A. PARKER, a citizen of the United States, residing at Meriden, in the county of New Haven and State of Connecticut, have invented a new and useful Improvement in Table-Dishes, of which the following is a specification, reference being had to the accompanying drawings, which are a part of the specification.

Figure 1:
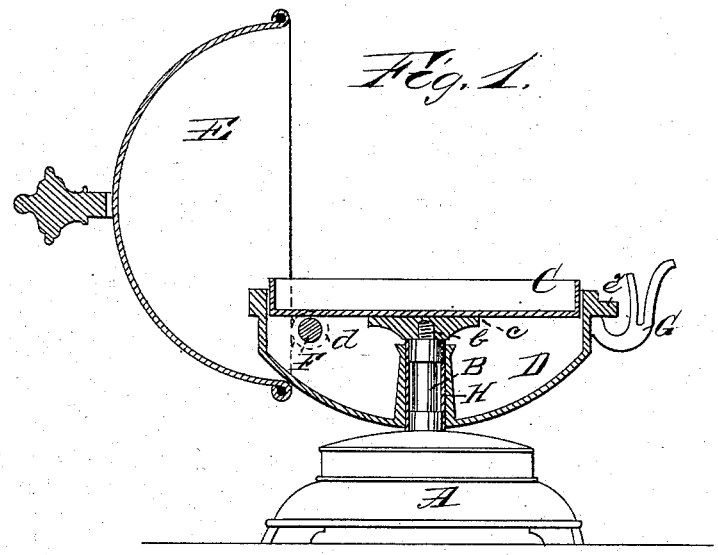
Figure 2:
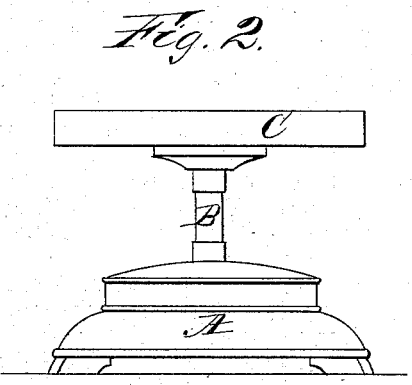
Figure 3:
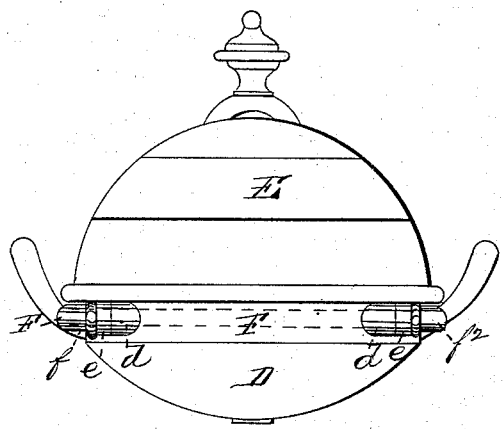

In the drawings, Figure 1 represents a side elevation of my improved dish, sectional as to cover, bowl, and drip-pan, and having cover thrown back. Fig. 2 represents the dish as used without drip-pan, and Fig. 3 the drip-pan and cover separated from the dish.

Similar lettters represent similar parts in all the figures.

It is the object of my invention to provide an attractive and useful table-dish which can be adapted to a variety of uses, be presented to the eye in different forms, and achieve a maximum of convenience in its various uses.

In the drawings, A is the base or foot of the dish; B, an upright post, vertical with the foot and securely fastened in the center thereof; C, the fruit-bowl or food-receptacle, fastened rigidly by screw or other device, but removable therefrom.

D is a drip-pan or cover-supporter, arranged to be used in connection with the dish when the articles contained in the dish require ice, or a cover is required. The drip-pan D is constructed with a tube, H, in the center, firmly attached to the bottom of the pan, through which is a hole corresponding with the size of the tube, said tube being of a size to fit the post B and revolve thereon. E is a cover attached to and readily detached from said pan. On the outside of the pan I place ears $d\ d$, through which holes are pierced extending through the sides of the pan. Rings or joints $e\ e$ are placed on the cover E at points to correspond with the ears $d\ d$, which they fit closely at either end.

Through the joints $e$ and ears $d$ and the body of the pan, from side to side, is run a bolt, F, provided with head $f$ and nut $f^2$. By removing the nut $f^2$ the bolt may be readily withdrawn and the cover removed. On the opposite side of the pan is a rest, $e^2$, to support the cover when in place.

On the bottom of the bowl or dish C, I solder a cap or star plate, $c$, which strengthens the bowl. Through the center of this cap is a hole, in which a thread is cut to receive the screw $b$ on top of post B. I also attach to the drip-pan a support for spoon, knife, fork, or tongs, whichever may be appropriate in handling the contents of the food-receptacle. It is obvious that the same results may be obtained by fastening permanently the post B to the food-receptacle and arranging the detachable fastening and revolving support below; but I prefer the arrangement above described.

I am aware that a butter-dish has been constructed in which the whole upper portion is revolved on a pin set up in the base; but such a device is useless practically, for when a knife or spoon is used on any food product having a comparatively firm consistency the dish revolving on its axis causes the food to retreat from the knife or spoon, attended with the ordinary and usual result of depositing a portion of the food on the table, and the defeat of the effort to convey any of it to the plate.

In my improvement the dish may be used for fruits or other food, or for flowers, independently of the revolving drip-pan or cover-supporter and the cover. When used in combination therewith it presents a rigid and immovable food-receptacle, while the revolving cover-support enables the cover to be readily revolved, so as not to be an impediment to access to the contents of the dish.

I do not claim broadly a revolving dish.

What I do claim, and desire to secure by Letters Patent, is—

1. The base A, post B, and food-receptacle C, combined with a revolving drip-pan or other cover-supporter, substantially as shown and described.

2. The combination of the base A, post B, and food-receptacle C with the revolving and detachable drip-pan or cover-supporter D, substantially as shown and described.

3. The combination of the base A, post B, and food-receptacle C with the revolving and detachable drip-pan or cover-supporter D and the cover E, substantially as shown and described.

4. The combination, in a table-dish, of the drip-pan or cover-supporter D and the cover E, held together by a detachable bolt, F, substantially as shown and described.

EDMUND A. PARKER.

Witnesses:
JAMES C. MURRAY,
GEO. W. WALLACE.